Nov. 11, 1952 J. C. SPINDLER 2,617,929

AUTOMATIC VOLUME CONTROL

Filed Dec. 6, 1947

INVENTOR.
JOSEPH C. SPINDLER
BY Paul Kolisch
ATTORNEY.

Patented Nov. 11, 1952 2,617,929

UNITED STATES PATENT OFFICE 2,617,929

AUTOMATIC VOLUME CONTROL

Joseph C. Spindler, Chicago, Ill., assignor to The Rauland Corporation, Chicago, Ill., a corporation of Illinois Application December 6, 1947, Serial No. 790,079

6 Claims. (Cl. 250—20)

Figure 1:
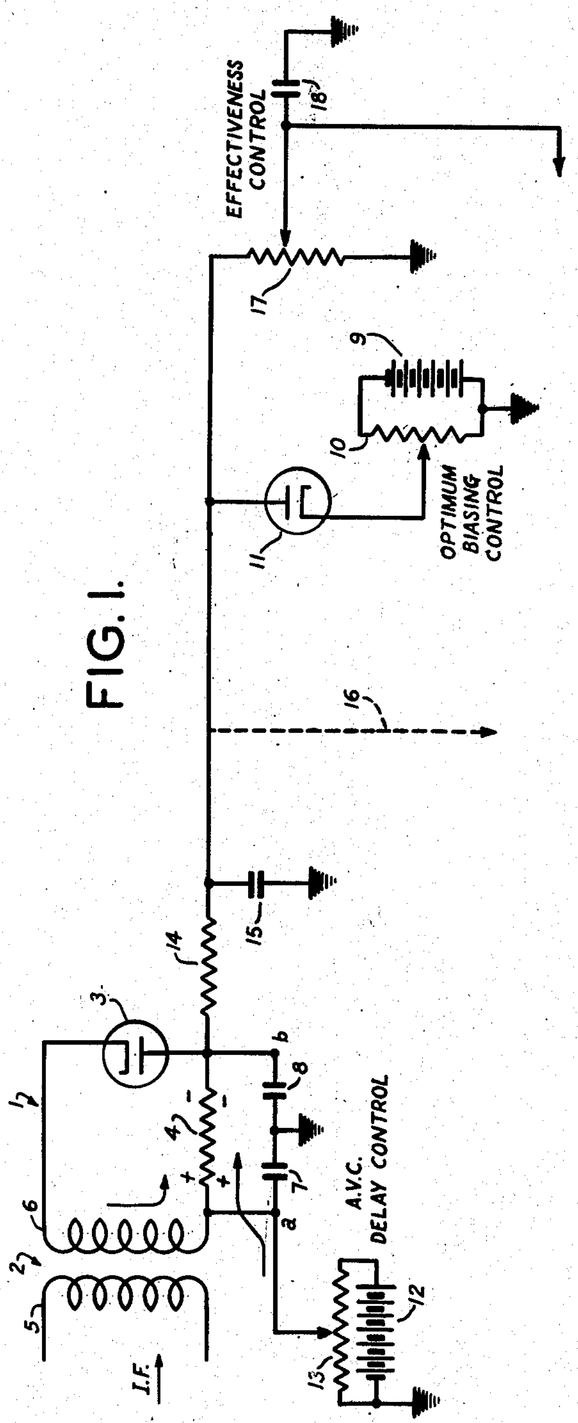

This invention relates to improvements in circuits of radio receivers. More particularly it relates to improvements in automatic volume control circuits for radio receivers.

Automatic volume control circuits of the prior art have already been successfully employed to achieve certain general purposes. A receiver equipped with such a circuit may be directly tuned from a weak station to a very much stronger one without producing a completely uncontrolled increase in output power, or, from a strong station to a weak station without a too serious diminution or complete loss of output. In an automobile radio such a circuit tends to stabilize the useful output as the input is varied, during movement of the automobile, by the shielding effect of metallic structures, such as bridges, and by variations in the orientation of the antenna. Similarly A. V. C. circuits have provided a useful measure of compensation for fluctuations in line voltage, changes in atmospheric conditions, and the like, which may change the level of output signal of a receiver which has already been set manually and thereafter left alone.

With advances in the radio receiver art it has become desirable that A. V. C. circuits be improved to achieve specific results.

In the case of television the receiver video output should be very closely controlled. A variation upward may produce excessive output signal which can damage the screen and, on the other hand, even a small variation downward may produce an insufficiently brilliant picture. Since in television the permissible range of output signal variation is narrow, an A. V. C. circuit for television, and in particular for a television picture channel, should be capable of exerting very precise control over the receiver. The receiver should be so precisely controlled that a plot of its input versus its output, i. e. its response characteristic, will be very flat over the principal operating range. Of course, for a portion of the plot near the common zero point of its axes, where input strength is below a predetermined low level and where, therefore, the full receiver gain should be used, the plot should have a steep slope. For signal strengths below this low point the A. V. C. circuit should not take hold. However, a second portion of the plot should form a sharp knee with the first portion and should be relatively flat and of a very small slope. When the receiver response curve has a flat principal portion and when the signals from most of the stations ordinarily received are above the said predetermined low point (so that the receiver is ordinarily operated within the flat principal portion) the input may be abruptly varied over a very wide range with negligible effect on the output. For example, even if the received signal includes a component which is reflected from a moving object such as a train, an automobile, or an airplane, and is changing in accordance with its movement, the picture will not flutter but will be held at very nearly a constant contrast level.

Obviously, the entire receiver characteristic cannot be flat. Signals from very distant, and/or very weak, stations will reach the input of the receiver at such low levels that the amount of gain necessary to raise them to a normal output level would be impractically large. For this reason the automatic volume control circuit of any receiver should be arranged to cut down the gain upon the receipt of signals which exceed a predetermined low level but to permit the full receiver gain to be effective for all signals below it whether they be considerably below it or only slightly below it. An A. V. C. circuit of this kind, i. e. which is effective only for signals above a predetermined level, is commonly referred to as a delayed automatic volume control circuit, the term, delayed, having a meaning in accordance with the above explanation rather than referring to any time lag in the operation of the circuit.

It has been customary in delayed A. V. C. circuits to provide a normal negative biasing voltage for the controlled amplifier stages which the A. V. C. circuit does not increase over the delayed range, i. e. does not increase for signals below the predetermined low level, but which it does increase for signals which exceed it. This normal bias is referred to as a "minimum bias" for the obvious reason that, while A. V. C. action may increase it, it never decreases it. These delayed A. V. C. circuits are arranged so that the level which detected signal components (extracted by an A. V. C. detector) must attain before A. V. C. action occurs can be adjusted by varying the value of the minimum biasing voltage. However, this is undesirable as it makes control of A. V. C. "delay" dependent upon interfering with normal bias. All of the receiver gain available should be used for weak signals therefore the normal bias actually should be set and left at an adjustment which is optimum for attaining maximum gain. The normal bias, therefore, in addition to being minimum, should be optimum and should be undisturbed except by A. V. C. action.

Delayed A. V. C. circuits of the prior art have a second shortcoming which will be apparent from the following description of how they operate. The means for achieving "delay" comprises, in a series circuit, a resistor, a clamping diode, and the minimum bias source connected to the diode cathode on its negative side and grounded on its positive side. The diode is poled so that the minimum bias source can force current through it and the resistor. As a result of this and of the low anode-to-cathode impedance of the diode, the anode, from which the operating "minimum bias" is taken off, will be clamped at substantially the potential level of the cathode. Most of the voltage drop in this series circuit will be across the resistor. The resistor is also connected into the A. V. C. detector circuit as its load resistor and the detector rectifier is so poled that detected signal components produce a voltage drop component of the same polarity as the voltage drop mentioned above, i. e. of the polarity to oppose the minimum bias source. As the level of detected signal components rises, the voltage drop component they produce across the load resistor will increase. Since the total voltage drop across the resistor will tend to exceed the voltage of the minimum bias source which it opposes, the current through the series circuit will decrease, but only to the point where the algebraic sum of the voltage drops all around the closed loop of the series circuit again equals zero. So long as the voltage drop component produced by detected signal components does not equal or exceed the first voltage drop mentioned above, some current will still flow in the series circuit, the anode will remain clamped, and the operating minimum bias will remain constant. However, for a circuit of the kind described this voltage drop component, throughout the delay range, can never be greater than the minimum biasing voltage and likewise gain control voltages developed for signals several times as great as signals of said predetermined low level (at which A. V. C. first takes hold) will be of a small order of magnitude since they will only be several times as great as the small minimum biasing voltage. To be specific for this kind of a circuit the ratio of a developed gain controlling voltage to the minimum biasing voltage (said controlling voltage being developed for an input signal which exceeds said predetermined threshold level) is about equal to and often less than the ratio of the level of that input signal to said threshold level. As a result of this a sharp knee in the receiver response characteristic is not obtained in prior art delayed A. V. C. circuits, nor is the response curve thereof beyond the knee flat and of very small slope. For prior art delayed A. V. C. circuits it is necessary to provide one or more stages of amplification for the A. V. C. control voltage if the receiver is to have a response characteristic as described above.

It is an object of the present invention to provide an improved delayed A. V. C. circuit having increased flexibility in that it is possible independently to adjust the minimum biasing voltage at an optimum level and the "delay" at a desired detected signal strength point.

It is a further object of this invention to provide an improved delay A. V. C. circuit in which the ratio of a developed gain controlling voltage to the minimum biasing voltage (said controlling voltage being developed for an input signal which exceeds said predetermined threshold level) is greater, and preferably very much greater, than the ratio of the level of that input signal to said threshold level.

It is a further object of the present invention to provide an improved delayed A. V. C. circuit which includes a means for controlling how sharply receiver gain is reduced for a given increase of input signal strength to control the flatness and smallness of slope of the portion of the receiver response curve above its knee.

Figure 2:
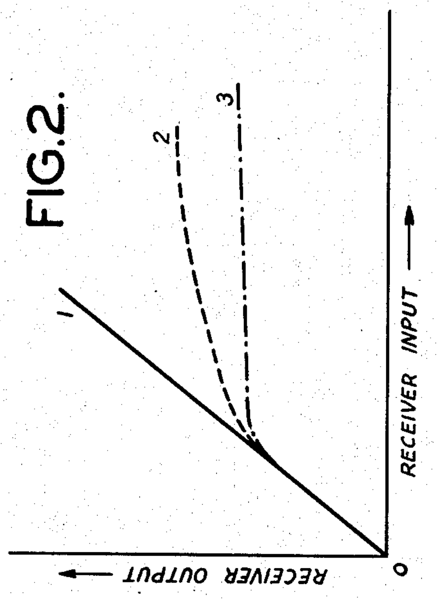

Other objects, features and advantages of this invention will be apparent to those skilled in the art from the following description of an embodiment of this invention and from the drawing in which:

Fig. 1 is a representation of an improved A. V. C. control circuit according to the present invention; and Fig. 2 is a group of curves showing respectively typical receiver response curves (overloading effects being neglected) where the receiver includes: (1) no A. V. C. circuit; (2) a conventional delayed A. V. C. circuit; and (3) an improved A. V. C. circuit according to the present invention.

Fig. 1 shows an A. V. C. detector circuit 1 comprising a transformer 2 for coupling signal energy from any convenient I. F. stage, such as one of the final stages, to a rectifier circuit consisting of a rectifier 3, which may be a diode, and a load resistance 4. Transformer 2 consists of primary 5, which may be tuned to the intermediate frequency by any known suitable means such as by a variable condenser or a movable core of high permeability (neither of which is shown) and may be connected in series with a discharge path of the I. F. tube (not shown) of said convenient stage, and a secondary 6 across which rectifier 3 and load resistor 4 are connected in series. I. F. signals will be rectified by tube 3 to pass currents through load resistor 4 in direction left to right in the figure to thereby develop voltage components across the load resistor of a polarity indicated in the drawing. High frequency current components which move in the rectifier circuit are by-passed around resistor 4 over condensers 7 and 8 which are in series and have their common connection grounded. During the receipt of signals, and the passage of intermediate frequency signals through the receiver, modulating components, such as video picture components, will be detected, in a known manner, to appear as relatively low frequency and/or direct current voltages across resistor 4. The whole of these voltages will appear between points *a* and *b* of the circuit of Fig. 1 and will be divided between condensers 7 and 8. One end of condenser 8 is grounded. Therefore, the other end will be a source of negative voltage which varies with respect to ground in accordance with the level of the I. F. signals reaching the detector, i. e. a voltage suitable for controlling receiver gain. A source of minimum biasing voltage, battery 9, has a movable tap voltage divider connected across its positive and negative terminals and has its positive terminal grounded. The movable tap is connected to the cathode of a clamping diode 11. The anode of clamping diode 11 is connected to a source of delay controlling potential comprising a battery 12 connected in shunt to an associated movable tap voltage divider 13, over a voltage dropping series circuit which includes detector load resistor 4 and, in the embodiment shown in Fig. 1, a resistor 14 of a low pass filter and extends between said anode of diode 11 and the movable tap of voltage divider 13. A high frequency by-pass condenser 15 grounded on its negative side, connected between resistor 14 and ground completes the low pass filter shown in the embodiment of Fig. 1. Battery 12 is grounded on its negative side so that any voltage taken from voltage divider 13 will be of positive polarity. Thus the batteries 9 and 12 are in series aiding both tending to force current through the voltage dropping series circuit from left to right in the figure. In the absence of any input I. F. signal over transformer 2 there will be a sufficient total voltage drop across load resistor 4 and filter resistor 14 to drop the anode of clamping diode 11 down to the negative potential of its cathode. Because of the negligible internal impedance of the diode and of the source of minimum biasing potential the anode will thus be clamped to the negative potential of the cathode at whatever value it may be fixed according to the adjustment of voltage divider 10, for example, at a value of −2 volts. In a preferred embodiment the resistance of voltage divider 10 should be small by comparison with the total resistance of the voltage dropping series circuit and the source of minimum biasing voltage should be well stabilized, i. e. regulated. In preferred embodiments battery 12 will provide a potential having a magnitude at least several times as great as that provided by battery 9, for example ten times as great. While both the minimum bias and A. V. C. voltages provided by this circuit may be taken directly from the anode of clamping diode 11 as indicated by the dotted line arrow 16, it will be preferable in circuit embodiments to employ a movable tap voltage divider 17 connected between the anode of diode 11 and ground to make it possible to control how much of the A. V. C. voltages developed by this circuit will be applied to the control grids of one or more amplifier tubes of the receiver. Moreover, if desired, there may be connected between ground and the sliding contact of this voltage divider a condenser 18 whose capacity is appropriate so that the control circuit will have an over-all time constant in accordance with the needs of the particular installation. For certain embodiments it may be desirable directly to connect the anode of diode 11 to the grids of a number of amplifier stages. For example, to connect several intermediate frequency amplifier control grids to the connection indicated by dotted line arrow 16, and to connect the final intermediate stage, or the last two intermediate stages, to the sliding contact of potentiometer 17. In such an arrangement the sharpness of automatic gain control over the stages connected directly over connection 16 will be relatively unadjustable after the circuit has been set up. However, the sharpness of gain control over the final stage, or stages, connected over the voltage divider 17 will be adjustable over a wide range to control the slope of the flat portion of the receiver response characteristic.

In three conditions of its operation the circuit of Fig. 1 will perform in the following manner:

(1) When there is no applied intermediate frequency signal the positive voltage applied to point *a* by the source of delay-control voltage 12, 13 will tend to raise the anode of clamping diode 11 to a value which is positive with respect to its cathode. However, the current through the voltage dropping series circuit will produce a sufficient total voltage drop (the sum of the drops across resistors 4 and 14) to keep the anode down to substantially the negative biasing voltage level provided at the cathode of the clamping diode. In this condition of the circuit voltage divider 10 may be adjusted so that the minimum bias has an optimum value, i. e. so that the gain of the receiver will be as great as possible. There will be established across load resistor 4 a reference voltage which may be of an order of magnitude nearer to that of the large delay controlling voltage than the small minimum biasing voltage and will have to be matched and exceeded by a voltage produced through the detection of intermediate frequency signals before the normal bias of this circuit will be altered, i. e. before the delay will be overcome and an effective A. V. C. voltage produced.

(2) When an intermediate frequency signal is applied to transformer 2 but it is below a predetermined low level, no current will flow through tube 3 and the current across resistors 4, 14 will be unchanged. Sufficient current will still flow to the anode of clamping diode 11 to maintain it clamped to the potential level of its cathode.

(3) When the input I. F. signal is above the predetermined low level (the no-signal IR drop across 4) current will flow through tube 3 increasing the IR drop across resistor 4 to make the anode voltage of diode 11 more negative than the clamping voltage and putting A. V. C. voltage into effect. Since the reference voltage developed across load resistor 4 by the direct current through the voltage dropping series circuit is of a much larger order of magnitude than the minimum biasing voltage detector circuit 1 may be connected into the receiver at a point where there has been a large amount of I. F. amplification without danger of an inadequate "delay." Thus once the threshold level is exceeded each increase in input signal will produce an A. V. C. voltage which will be very great by comparison with the minimum biasing voltage. For example, if the input signal is raised to twice said predetermined low level the developed control voltage may be many times the value of the minimum biasing voltage rather than only twice it. This will make possible a sharp reduction in receiver gain by appropriate application of the control voltage to the control grids of selected stages. In this manner a sharp knee will appear in the overall receiver characteristic as indicated by curve 3 of Fig. 2. The sharpness of reduction in receiver gain will be controllable by manipulation of voltage divider 17.

The present circuit may be adjusted in the following manner: Without input signals voltage divider 10 should be adjusted so that the minimum biasing voltage has a desired optimum value for producing maximum receiver gain. Voltage divider 13 is adjusted to set the desired delay, i. e. the predetermined low input level above which the actual output of the receiver will remain constant at a desired output level even though different input signals have different strengths above that level. In a television receiver if the cathode ray tube bias has been set for desired brightness and the receiver gain has been manually adjusted near to a point of satisfactory contrast, then voltage divider 13 may be manipulated so that for all strong and/or nearby stations a final contrast adjustment can be attained without further manipulating receiver gain. The receiver then is tuned between two of said stations of markedly different power in order to observe if there is any fluctuation in the picture contrast. If the fluctuation is too great, the effectiveness control, voltage divider 17, may be turned up to increase the amount of developed A. V. C. voltage fed to the grids of the control tubes, i. e. to increase the sharpness of receiver gain control. Since this will tend also to slightly increase the effective minimum biasing voltage fed to the final stage(s) a final adjustment will consist of readjusting the setting of voltage divider 10 to compensate for this.

While in the embodiment shown in Fig. 1 a low pass filter 14, 15 is included it is obvious that this is not essential to the proper functioning of a circuit according to the present invention. While the embodiment shown herein derives A. V. C. voltages by detecting intermediate frequency signals it is obvious that this circuit would be equally applicable to tuned radio frequency receivers wherein the detector 2, 3, 4 would be fed with radio frequency signals.

While both the rectifier circuit and the minimum bias clamping circuit shown herein employ diodes, it is obvious that other elements of similar characteristics can be used in place of diodes, for example, crystal and dry-disc rectifiers, other types of discharge devices which, like diodes, include a cathode and an anode, or any other devices which have very low impedance in one direction and very high impedance in the other.

What is claimed is:

1. An automatic volume control circuit comprising an input circuit for intermediate frequency signals including a transformer having a primary and a secondary, a detector circuit including a rectifier and a load resistor which are in series as to each other and are connected across said secondary, and a control circuit comprising a first, adjustable source of minimum biasing potential grounded on its positive terminal, a clamping discharge device having an anode and a cathode and having the cathode connected to the negative terminal of the source of minimum biasing potential, a second, adjustable source of delay controlling potential distinct and separate from said first source and having its negative terminal connected to ground and its positive terminal connected to said anode over a voltage-dropping series circuit including said load resistor.

2. An automatic volume control circuit as in claim 1, and including a low pass filter for the detector output, the low pass filter including a filter resistor in said voltage dropping series circuit and a condenser connected between ground and the end of the filter resistor farthest from said load resistor.

3. An automatic volume control circuit as in claim 1, and including in shunt to the load resistor two intermediate frequency by-pass condensers in series, the common connection of these two condensers being connected to ground.

4. An automatic volume control circuit comprising an input circuit for intermediate frequency signals including a transformer having a primary and a secondary, a detector circuit including a rectifier and a load resistor which are in series as to each other and are connected across said secondary, a control circuit comprising a source of minimum biasing potential grounded on its positive terminal, a clamping discharge device having an anode and a cathode and having the cathode connected to the negative terminal of the source of minimum biasing potential, a source of delay controlling potential having its negative terminal connected to ground and its positive terminal connected to said anode over a voltage-dropping series circuit including said load resistor, a low pass filter for the detector output, the low pass filter including a filter resistor in said voltage-dropping series circuit and a condenser connected between ground and the end of the filter resistor farthest from said load resistor, two intermediate frequency by-pass condensers in shunt to the load resistor and in series as to each other, the common connection of these two condensers being connected to ground, and an effectiveness control for the automatic volume control circuit comprising a voltage divider connected across the anode of the clamping discharge device and ground, the voltage divider having a movable tap from which output volume control voltages are derived.

5. An automatic gain control circuit comprising a signal wave detector circuit including a rectifier and a load resistor in series, said rectifier including an anode and a cathode and said load resistor being connected to the rectifier on its anode side, a bias control line connected to the anode of the rectifier, a diode having anode and cathode electrodes and connected on its anode side to the bias control line and therethrough to the anode of the rectifier and to the load resistor, an adjustable source of minimum bias control potential grounded on its positive terminal and having its negative terminal connected to the cathode of the diode for applying to the bias control line by way of the diode a desired minimum bias control potential selected by adjustment of the aforementioned source, and a separate, adjustable source of delay controlling voltage grounded on its negative terminal and having its positive terminal connected via said load resistor to the anode of the rectifier to neutralize the effect of rectified signal voltage on the bias control line until the signal voltage reaches an amplitude selected solely by adjustment of the source of delay controlling voltage regardless of the value of minimum bias control potential selected by the adjustment of the source of bias control potential.

6. An automatic volume control circuit comprising a signal wave detector circuit including a rectifier and a load resistor, a bias control line, a minimum bias potential source grounded on its positive terminal, a clamping discharge device having an anode tied to said line and a cathode connected to the negative terminal of said minimum bias source, a further potential source to supply delay controlling potential and grounded on its negative terminal, a voltage-dropping series circuit including said load resistor connecting said anode to the positive terminal of said further source and over which the latter source forces current in a direction to apply potential to the anode of the discharge device adequate to maintain said device conductive and the bias control line, consequently, at minimum bias potential until the signal amplitude increases to a predetermined amplitude, said rectifier having a polarity in the detector circuit for forcing the detector circuit to pass signal current over said load resistor in said direction so as to increase the voltage drop across said resistor and thereby to reduce the potential applied to said anode as the signal amplitude increases, with the anode-applied potential being decreased to cut-off value upon the signal reaching said predetermined amplitude, whereupon said discharge device stops conducting and the bias control line varies in potential according to the further increase in signal amplitude.

JOSEPH C. SPINDLER.

REFERENCES CITED

The following references are of record in the file of this patent:

UNITED STATES PATENTS

| Number | Name | Date |
|---|---|---|
| 2,018,982 | Travis | Oct. 29, 1935 |
| 2,144,304 | Braden | Jan. 17, 1939 |
| 2,171,657 | Klotz | Sept. 5, 1939 |
| 2,207,905 | Weagant | July 16, 1940 |
| 2,246,947 | Martinelli | June 24, 1941 |
| 2,296,393 | Martinelli | Sept. 22, 1942 |